(12) United States Patent
Newman et al.

(10) Patent No.: US 12,530,032 B2
(45) Date of Patent: Jan. 20, 2026

(54) LOCALISING A VEHICLE

(71) Applicant: Oxford University Innovation Limited, Oxford (GB)

(72) Inventors: Paul Newman, Oxford (GB); Horia Porav, Oxford (GB); Will Maddern, Oxford (GB)

(73) Assignee: Oxford University Innovation Limited, Oxford (GB)

( * ) Notice: Subject to any disclaimer, the term of this patent is extended or adjusted under 35 U.S.C. 154(b) by 849 days.

(21) Appl. No.: 16/962,533

(22) PCT Filed: Jan. 18, 2019

(86) PCT No.: PCT/GB2019/050133
§ 371 (c)(1),
(2) Date: Jul. 16, 2020

(87) PCT Pub. No.: WO2019/141992
PCT Pub. Date: Jul. 25, 2019

(65) Prior Publication Data
US 2020/0379481 A1 Dec. 3, 2020

(30) Foreign Application Priority Data
Jan. 18, 2018 (GB) ...................... 1800811

(51) Int. Cl.
*G05D 1/00* (2024.01)
(52) U.S. Cl.
CPC ......... *G05D 1/0268* (2013.01); *G05D 1/0251* (2013.01)
(58) Field of Classification Search
CPC .................. G05D 1/0268; G05D 1/0251
See application file for complete search history.

(56) References Cited

U.S. PATENT DOCUMENTS 6,281,928 B1 * 8/2001 Umezaki .................. G06T 7/11
348/148
2016/0259981 A1 9/2016 Wang et al.
(Continued)

FOREIGN PATENT DOCUMENTS

CN 101458764 A 6/2009
CN 102037489 A 4/2011
(Continued)

OTHER PUBLICATIONS

Ashish Shrivastava, Tomas Pfister, Oncel Tuzel, Josh Susskind, Wenda Wang, Russ Webb "Learning from Simulated and Unsupervised Images through Adversarial Training" Jul. 19, 2017, Apple Inc. Version 2. (Year: 2017).*
(Continued)

*Primary Examiner* — Wade Miles
*Assistant Examiner* — Aaron G Cain
(74) *Attorney, Agent, or Firm* — Emerson Thomson & Bennett; Daniel A. Thomson

(57) ABSTRACT

A computerised method of generating a first trainable transform arranged to be used in localisation of an entity, the transform being arranged to transform a first representation of an environment to a second, different, representation of the environment, the method comprising processing a plurality of first training representations of an environment using the first trainable transform to generate a transformed first training representation; performing at least one of: i)) running at least one known process on the first training representation and a modified version of the first training representation to generate an error signal where in the process is selected such that the first trainable transform is arranged to enhance features within the first training representation; and ii) running at least one known process on a second training representation, corresponding to the first (Continued)

training representation, but under a different lighting condition, and on the modified version of the first training representation to generate an error signal wherein the process is selected such that the first trainable transform is arranged to enhance features within the first training representation; and; c) using the error signal to train the first transform.

20 Claims, 10 Drawing Sheets

(56) References Cited

U.S. PATENT DOCUMENTS

| | | | | |
|---|---|---|---|---|
| 2017/0076455 | A1* | 3/2017 | Newman | G06T 7/74 |
| 2018/0168749 | A1* | 6/2018 | Dozeman | B25J 9/1674 |
| 2019/0049242 | A1* | 2/2019 | Adams | G01S 7/4972 |

FOREIGN PATENT DOCUMENTS

| | | |
|---|---|---|
| CN | 106530270 A | 3/2017 |
| CN | 106815583 A | 6/2017 |
| CN | 107506739 A | 12/2017 |

OTHER PUBLICATIONS

International Search Report and Written Opinion for PCT/GB2019/050133, dated Apr. 5, 2019, pp. 1-19.
UK Search Report for GB 1800811.0, dated Jul. 17, 2018, pp. 1-4.
Jun-Yan Zhu et al: "Unpaired Image-to-Image Translation using Cycle-Consistent Adversarial Networks", arxiv.org, Cornell University Library, 2010 Library Cornell University Ithaca, NY 14853, Mar. 30, 2017 (Mar. 30, 2017).
Hillip Isola et al: "Image-to-Image Translation with Conditional Adversarial Networks", arxiv.org, Cornell University Library, 2010 Library Cornell University Ithaca, NY 14853, Nov. 21, 2016 (Nov. 21, 2016).
C. Linegar, W. Churchill, and P. Newman, "Made to measure: Bespoke landmarks for 24-hour, all-weather localisation with a camera," in Proceedings—IEEE International Conference on Robotics and Automation, vol. 2016—Jun. 2016, pp. 787-794.
C. McManus, B. Upcroft, and P. Newman, "Learning place-dependant features for long-term vision-based localisation," Autonomous Robots, vol. 39, No. 3, pp. 363-387, 2015.
W. Churchill and P. Newman, "Experience-based navigation for longterm localisation," The International Journal of Robotics Research, vol. 32, No. 14, pp. 1645-1661, 2013.
R. Mur-Artal and J. D. Tard'os, "ORB-SLAM2: an open-source SLAM system for monocular, stereo and RGB-D cameras," CoRR, vol. abs/1610.06475, 2016.
P. Furgale and T. D. Barfoot, "Visual teach and repeat for long-range rover autonomy," Journal of Field Robotics, vol. 27, No. 5, pp. 534-560, May 2010.
C. Linegar, W. Churchill, and P. Newman, "Work smart, not hard: Recalling relevant experiences for vast-scale but time-constrained localisation," in Proceedings—IEEE International Conference on Robotics and Automation, vol. June. 2015, No. Jun. 2015, pp. 90-97.
J. Zhu, T. Park, P. Isola, and A. A. Efros, "Unpaired image-to-image translation using cycle-consistent adversarial networks," CoRR, vol. abs/1703.10593, 2017.
W. Yan, X. Shi, X. Yan, and L. Wang, "Computing OpenSURF on OpenCL and general purpose GPU," International Journal of Advanced Robotic Systems, vol. 10, 2013.
T. B. Terriberry, L. M. French, and J. Helmsen, "Gpu accelerating speeded-up robust features," in Proceedings of BDPVT, vol. 8, 2008, pp. 355-362.

W. W.-C. Chiu and M. Fritz, "See the difference: Direct pre-image reconstruction and pose estimation by differentiating hog," 2015 IEEE International Conference on Computer Vision (ICCV), pp. 468-476, 2015.
A. Torii, R. Arandjelovi'c, J. Sivic, M. Okutomi, and T. Pajdla, "24/7 place recognition by view synthesis," in Proceedings of the IEEE Computer Society Conference on Computer Vision and Pattern Recognition, vol. Jun. 7-12, 2015, pp. 1808-1817.
S. Cascianelli, G. Costante, E. Bellocchio, P. Valigi, M. L. Fravolini, and T. A. Ciarfuglia, "Robust visual semi-semantic loop closure detection by a covisibility graph and CNN features," Robotics and Autonomous Systems, vol. 92, pp. 53-65, 2017.
E. Johns and G.-Z. Yang, "Feature co-occurrence maps: Appearancebased localisation throughout the day," in Robotics and Automation (ICRA), 2013 IEEE International Conference on. IEEE, 2013, pp. 3212-3218.
P. Neubert, N. Sunderhauf, and P. Protzel, "Appearance change prediction for long-term navigation across seasons," In Mobile Robots (ECMR), 2013 European Conference on. IEEE, 2013, pp. 198-203.
P. Mühlfellner, M. Bürki, M. Bosse, W. Derendarz, R. Philippsen, and P. Furgale, "Summary Maps for Lifelong Visual Localization," Journal of Field Robotics, vol. 33, No. 5, pp. 561-590, Aug. 2016.
G. Yu and J.-M. Morel, "Asift: An algorithm for fully affine invariant comparison," Image Processing On Line, vol. 1, pp. 11-38, 2011.
R. Gomez-Ojeda, Z. Zhang, J. Gonzalez-Jimenez, and D. Scaramuzza, "Learning-based image enhancement for visual odometry in challenging hdr environments," arXiv preprint arXiv:1707.01274, 2017.
Y. Shih, S. Paris, F. Durand, and W. T. Freeman, "Data-driven hallucination of different times of day from a single outdoor photo," ACM Trans. Graph., vol. 32, No. 6, pp. 200:1-200:11, Nov. 2013.
L.A. Gatys, A. S. Ecker, and M. Bethge, "Image style transfer using convolutional neural networks," in The IEEE Conference on Computer Vision and Pattern Recognition (CVPR), Jun. 2016.
M. Liu, T. Breuel, and J. Kautz, "Unsupervised image-to-image translation networks," CoRR, vol. abs/1703.00848, 2017.
H. Bay, T. Tuytelaars, and L. Van Gool, "Surf: Speeded up robust features," Computer vision—ECCV 2006, pp. 404-417, 2006.
R. Guerrero, C. Qin, O. Oktay, C. Bowles, L. Chen, R. Joules, R. Wolz, M. Valdes-Hernandez, D. Dickie, J. Wardlaw, et al., "White matter hyperintensity and stroke lesion segmentation and differentiation using convolutional neural networks," arXiv preprint arXiv:1706.00935, 2017.
O. Ronneberger, P. Fischer, and T. Brox, "U-net: Convolutional networks for biomedical image segmentation," in International Conference on Medical Image Computing and Computer-Assisted Intervention. Springer, 2015, pp. 234-241.
K. He, X. Zhang, S. Ren, and J. Sun, "Deep residual learning for image recognition," in The IEEE Conference on Computer Vision and Pattern Recognition (CVPR), Jun. 2016.
C. Evans, "Notes on the OpenSURF Library," University of Bristol Tech Rep CSTR09001 January, No. 1, p. 25, 2009.
H. Zhou, T. Sattler, and D. W. Jacobs, "Evaluating local features for day-night matching," in Computer Vision—ECCV 2016 Workshops—Amsterdam, The Netherlands, Oct. 8-10 and 15-16, 2016, Proceedings, Part III, 2016, pp. 724-736.
W. Maddern, G. Pascoe, C. Linegar, and P. Newman, "1 Year, 1000km: The Oxford RobotCar Dataset," The International Journal of Robotics Research (IJRR), vol. 36, No. 1, pp. 3-15, 2017.
D. P. Kingma and J. Ba, "Adam: A method for stochastic optimization," CoRR, vol. abs/1412.6980, 2014.
M. Cummins and P. Newman, "Appearance-only slam at large scale with fab-map 2.0," The International Journal of Robotics Research, vol. 30, No. 9, pp. 1100-1123, 2011.
M. A. Fischler and R. C. Bolles, "Random sample consensus: a paradigm for model fitting with applications to image analysis and automated cartography," Communications of the ACM, vol. 24, No. 6, pp. 381-395, Jun. 1981.
Examination Report for European Application No. 19 701 720.5, dated May 2, 2023, pp. 1-18.

(56) References Cited

OTHER PUBLICATIONS

Japanese Decision of Rejection for Application No. 2020-539786, dated Mar. 14, 2023, pp. 1-4 (Translation not X Included, application abandoned).
Examination Report for Japanese Application No. 2020-539786, dated Sep. 30, 2022, pp. 1-7 (Machine Translation Included).
International Preliminary Report on Patentability for PCT/GB2019/050133, dated Jul. 21, 2020, pp. 1-14.
Chinese Office Action for Application No. 201980007780.3, dated Oct. 31, 2023, pp. 1-20 (Translation Included).
Australian Office Action for Application No. 2019208479, dated Jun. 21, 2023, pp. 1-3.
Chinese Office Action; CN 201980007780.3; dated Nov. 22, 2024; 5 pages.

* cited by examiner

LOCALISING A VEHICLE

CROSS-REFERENCE TO RELATED APPLICATIONS

This application is the National Stage of International Application No. PCT/GB2019/050133, filed Jan. 18, 2019, which claims priority to GB 1800811.0, filed Jan. 18, 2018, which are entirely incorporated herein by reference.

FIELD OF THE INVENTION

The invention relates to method and related apparatus for localising a vehicle, typically in environments with large changes in appearance. In particular, but not exclusively, embodiments are camera only systems.

BACKGROUND OF THE INVENTION

Keypoint feature matching (such as SURF, SIFT, BRIEF, ORB, or the like) represents the leading approach in multi-map visual localisation systems, as used in prior art documents such as:
[1] C. Linegar, W. Churchill, and P. Newman, "Made to measure: Bespoke landmarks for 24-hour, all-weather localisation with a camera," in Proceedings-IEEE International Conference on Robotics and Automation, vol. 2016-June, 2016, pp. 787-794.
[2] C. McManus, B. Uperoft, and P. Newman, "Learning place-dependant features for long-term vision-based localisation," Autonomous Robots, vol. 39, no. 3, pp. 363-387, 2015.
[3] W. Churchill and P. Newman, "Experience-based navigation for longterm localisation," The International Journal of Robotics Research, vol. 32, no. 14, pp. 1645-1661, 2013.
[4] R. Mur-Artal and J. D. Tard'os, "ORB-SLAM2: an open-source SLAM system for monocular, stereo and RGB-D cameras," CoRR, vol. abs/1610.06475, 2016.
[5] P. Furgale and T. D. Barfoot, "Visual teach and repeat for long-range rover autonomy," Journal of Field Robotics, vol. 27, no. 5, pp. 534-560, May 2010,
and many other commercial systems. While this works well when matching scenes with similar lighting conditions, performance quickly breaks down when the appearance of the scenes differs due to changes in illumination levels, or seasonal differences, such as when used outside. Attempting to use standard descriptors (such as SURF, SIFT, BRIEF, ORB, or the like) will likely lead to poor localisation. In order for these point-feature based methods to work, the mapping procedure would typically need to be performed for each category of appearance (sunny, snow, dawn, dusk, rain, night etc).

A further prior art technique is shown in: [6] C. Linegar, W. Churchill, and P. Newman, "Work smart, not hard: Recalling relevant experiences for vast-scale but time-constrained localisation," in Proceedings-IEEE International Conference on Robotics and Automation, vol. 2015-June, no. June, 2015, pp. 90-97; [7] J. Zhu, T. Park, P. Isola, and A. A. Efros, "Unpaired image-to-image translation using cycle-consistent adversarial networks," CoRR, vol. abs/1703.10593, 2017;
[8] W. Yan, X. Shi, X. Yan, and L. Wang, "Computing OpenSURFon OpenCL and general purpose GPU," International Journal of Advanced Robotic Systems, vol. 10, 2013.
[9] T. B. Terriberry, L. M. French, and J. Helmsen, "Gpu accelerating speeded-up robust features," in Proceedings of 3DPVT, vol. 8, 2008, pp. 355-362.
[10] W. W.-C. Chiu and M. Fritz, "See the difference: Direct pre-image reconstruction and pose estimation by differentiating hog," 2015 IEEE International Conference on Computer Vision (ICCV), pp. 468-476, 2015, which introduces differentiable HOG descriptors and use it in a pipeline to improve rendered images.

RELATED WORK

Topological Localisation: Synthetic images have seen use in topological localisation, with [12] A. Torii, R. Arandjelovi'c, J. Sivic, M. Okutomi, and T. Pajdla, "24/7 place recognition by view synthesis," in Proceedings of the IEEE Computer Society Conference on Computer Vision and Pattern Recognition, vol. 07-12-June, 2015, pp. 1808-1817 showing that point of-view makes a large difference when matching across images with large changes in appearance, and subsequently using Google Streetview panoramas to synthesize images that match the point of view of a query image. Co-visibility graphs for CNN features were used by [13] S. Cascianelli, G. Costante, E. Bellocchio, P. Valigi, M. L. Fravolini, and T. A. Ciarfuglia, "Robust visual semi-semantic loop closure detection by a covisibility graph and CNN features," Robotics and Autonomous Systems, vol. 92, pp. 53-65, 2017, boosting the invariance to viewpoint changes by adding features from neighbouring views to the image that is currently queried, essentially creating 'in-between' views. In [14] E. Johns and G.-Z. Yang, "Feature co-occurrence maps: Appearance based localisation throughout the day," in Robotics and Automation (ICRA), 2013 IEEE International Conference on. IEEE, 2013, pp. 3212-3218., features that co-occur for each image taken at different times of the day are combined into a unique representation that contains features identifiable in any image from that point of view, irrespective of illumination conditions.

Changes in an image across seasons were predicted by [15] P. Neubert, N. Sunderhauf, and P. Protzel, "Appearance change prediction for long-term navigation across seasons," in Mobile Robots (ECMR), 2013 European Conference on. IEEE, 2013, pp. 198-203 using vocabularies of superpixels and used for place recognition. How a winter scene would look in the summer (and vice-versa) is predicted by first partitioning the image into superpixels, associating each superpixel with an entry in the winter vocabulary and then replacing the superpixel with its counterpart from the summer vocabulary by using a dictionary that maps between vocabularies. However, these synthetic views suffer from poor alignment or degradation of point features, meaning that metric localisation cannot be achieved.

Metric Localisation: In the context of metric localisation, [16] P. Mühlfellner, M. Bürki, M. Bosse, W. Derendarz, R. Philippsen, and P. Furgale, "Summary Maps for Lifelong Visual Localization," Journal of Field Robotics, vol. 33, no. 5, pp. 561-590, aug 2016 refine the multi-experience approach by introducing a step that creates a 'summary map' from multi-experience maps during online localisation, using a framework of sampling policies and ranking functions. However, their approach does not mitigate the need to perform mapping under various conditions. In [17] G. Yu and J.-M. Morel, "Asift: An algorithm for fully affine invariant comparison," Image Processing On Line, vol. 1, pp. 11-38, 2011, authors generate different views of the images to be matched using affine transforms and apply SIFT to these generated views, showing an increased robustness to changes in viewpoint, but without addressing changes in appearance.

High dynamic range image matching in the context of visual odometry is improved in [18] R. Gomez-Ojeda, Z. Zhang, J. Gonzalez-Jimenez, and D. Scaramuzza, "Learning-based image enhancement for visual odometry in challenging hdr environments," arXiv preprint arXiv:1707.01274, 2017 by training an LSTM deep neural network to produce temporally consistent enhanced representations of the images. However, visual odometry works with images that are temporally close with few lighting or appearance changes.

Appearance Transfer: Synthetic image techniques have been used for other tasks, but show promise in localisation contexts: [19] Y. Shih, S. Paris, F. Durand, and W. T. Freeman, "Data-driven hallucination of different times of day from a single outdoor photo," ACM Trans. Graph., vol. 32, no. 6, pp. 200:1-200:11, November 2013 use local affine transforms in a color transfer technique to 'hallucinate' the appearance of an image at different times of day. In [20] L. A. Gatys, A. S. Ecker, and M. Bethge, "Image style transfer using convolutional neural networks," in The IEEE Conference on Computer Vision and Pattern Recognition (CVPR), June 2016, images are decomposed into style and content representations using a VGG-19 network, followed by synthesization, starting from a white noise image and using gradient descent, of an image that matches the content representation of the input image and the style representation of the target image.

[7] demonstrates unsupervised image-to-image translation by training a pair of CNN generators, G that maps X to Y, and F that maps Y to X, and apply a 'cycle consistency' L1 loss between X and F(G(X)) along with discriminator losses LG on the output of G and $L_F$ on the output of F. Similarly, [21] M. Liu, T. Breuel, and J. Kautz, "Unsupervised image-to-image translation networks," CoRR, vol. abs/1703.00848, 2017 train a pair of Variational Autoencoder—Generative Adversarial Network (VAE-GANs) for image to image translation using unaligned images, but do not use a cycle-consistency loss, instead choosing to partially share high-level layer weights and to share the latent-space encodings between the VAEs. The authors train on different domain transformation pairs, including semantic-labels to natural images and day images to night images, but do not demonstrate any topological or metric localisation applications. We believe we are the first to directly address metric localisation using an appearance transfer approach.

SUMMARY OF THE INVENTION

According to a first aspect of the invention there is provided a computerised method of generating a first trainable transform arranged to be used in localisation of an entity. Conveniently the transform is arranged to transform a first representation of an environment to a second, different, representation of the environment. The method may comprise at least one of the following steps:
a) processing a plurality of first training representations of an environment using the first trainable transform to generate a transformed first training representation;
b) performing at least one of:
  i) running at least one known process on the first training representation and a modified version of the first training representation to generate an error signal wherein the process is selected such that the first trainable transform is arranged to enhance features within the first training representation; and
  ii) running at least one known process on a second training representation, corresponding to the first training representation, but under a different lighting condition, and on the modified version of the first training representation to generate an error signal wherein the process is selected such that the first trainable transform is arranged to enhance features within the first training representation;
  and;
c) using the error signal to train the first transform.

The prior art attempts to improve the detectors, descriptors or other known processors to improve localisation. However, embodiments providing such an aspect instead modify the input images by training the trainable transforms. In this way, the trainable transforms can be used to generate representations that may be better suitable for localisation. Typically, representations that are processed in this way can be used with any existing system based on feature-matching, usually without changing it.

Thus embodiments should save significant effort since mapping for all conditions is time consuming, expensive and may well be impossible in certain cases. Also, it is noted that the quality of data collected during adverse conditions can be worse when compared to representations that have been transformed by a trained transform, leading to lower accuracy in any generated maps.

Embodiments may be thought of as providing a differentiable feature detector and/or descriptor pipeline (or any other suitable known transform) as part of an adversarially-trained network designed to synthesise images of the same location under different conditions.

Some embodiments may provide a first stage of training. In such a first stage, the method may comprise selecting a complete source-condition traversal and a small portion of a target-condition traversal and, without any alignment of the images, train a pair of trainable transforms. The training may be performed by an error signal comprised of the either of the following: a cycle-consistency loss, discriminator loss and feature detector and descriptor losses.

Some embodiments may also provide a further stage of training, which may be termed a fine tuning stage. In the further stage of training a number of well aligned target—and source representation pairs are selected. The trainable transforms may then be trained using these well aligned representations, generally using an L1 loss on the known transform (such as the feature detector and/or descriptor outputs). The well aligned representations may be selected based upon metric six degree of freedom groundtruth.

Some embodiments may simply provide the further stage of training without providing the first stage. Other embodiments may provide only the first stage, or provide both the first and the second stage.

Conveniently, the transformed first training is transformed using a second trainable transform, wherein the second trainable transform is trained to invert the effect of the first trainable transform, to generate a synthetic first training representation.

In some embodiments, the modified first training representation is the transformed first training representation.

In some embodiments, the modified first training representation is the synthetic first training representation.

Conveniently, the error signal is also used to train the second trainable transform.

Generally, the first and second trainable transforms are provided by a neural network. However, in some embodiments other trainable transforms may be used such as genetic algorithms or the like.

Conveniently, the known process generates feature descriptors.

Additionally, or alternatively, the known process detects features within the first and second representations.

Generally, the weights of the trainable transform are initialized before training commences in order to zero, or otherwise set, the value before training commences.

Some embodiments may use a discriminator to be able to discriminate whether a representation is a synthetic representation which can help to improve the quality of the representations generated by the first and/or second trainable transform.

The method may be arranged to repeat training of the method using a set of second training representations being representations corresponding to representations from the first training representations but under different lighting conditions.

In one embodiment, such a method may lead to the following method of generating a first and a second trainable transform arranged to be used in localisation of an entity, the transform being arranged to transform a first representation of an environment to a second, different, representation of the environment, the method comprising:
  a) processing a plurality of first training representations of an environment using the first trainable transform to generate a transformed first training representation;
  b) processing the transformed first training representation using the second trainable transform, wherein the second trainable transform is arranged to invert the first trainable transform, to generate a synthetic first training representation;
  c) running at least one known process on both the first training representation and the synthetic first training representation to generate an error signal wherein the process is selected such that the first trainable transform is arranged to enhance features within the first training representation; and
  d) using the error signal to train at least one of the first and second trainable transforms.

According to a second aspect of the invention there is provided use of a trainable transform, trained according to the method of the first aspect of the invention, and used in a vehicle to localise, or at least assist, in localising the vehicle in matching input representation against a library of stored representations.

According to a third aspect of the invention there is provided a vehicle having a sensor arranged to take current representations of the vehicle surroundings. The vehicle may be comprise a processing circuitry having access to a library of stored representations of the surroundings, wherein the processing circuitry is arranged to perform the following:
  a) at least one of:
    i) transforming the current representations using a transform and searching the library of stored representations for the transformed image; and
    ii) transforming at least some of the stored representations from the library and searching the transformed stored representations for the current representation;
  wherein the transformation performed in step a) is arranged to enhance features within the transformed representation;
  b) using representations from the library of stored representations that are located in the search to localise the vehicle.

Once the trainable transforms have been trained they can be used to generate synthetic representations and used in a vehicle. In one embodiment, the synthetic images are then used in a stereo localisation pipeline based on [3]. This pipeline first performs place recognition, outputting candidate frames that are most likely to be from the same place as the vehicles live frame, and subsequently, uses keypoint feature matching to compute a metric pose between the live frame and the frame(s) retrieved during place recognition.

The skilled person will appreciate that reference to a transformed representation is intended to mean a representation that has undergone a transform. In the context of aspects of the invention a transformed image may be a modified image or a synthetic image.

According to a fourth aspect of the invention there is provided a system arranged to train a first trainable transform arranged to transform a first representation of an environment to a second, different, representation of the environment, The system may comprise processing circuitry being programmed to perform at least one of the following steps:
  a) process a plurality of first training representations of an environment using the first trainable transform to generate a transformed first training representation;
  b) perform at least one of:
    i)) running at least one known process on the first training representation and a modified version of the first training representation to generate an error signal wherein the process is selected such that the first trainable transform is arranged to enhance features within the first training representation; and
    ii) running at least one known process on a second training representation, corresponding to the first training representation, but under a different lighting condition, and on the modified version of the first training representation to generate an error signal wherein the process is selected such that the first trainable transform is arranged to enhance features within the first training representation;
  and;
  c) use the error signal to train the first transform.

According to a fifth aspect of the invention there is provided a machine readable medium contain instructions which when read by a computer cause that machine to perform one or more of the following:
  a) process a plurality of first training representations of an environment using the first trainable transform to generate a transformed first training representation;
  b) perform at least one of:
    i)) running at least one known process on the first training representation and a modified version of the first training representation to generate an error signal wherein the process is selected such that the first trainable transform is arranged to enhance features within the first training representation; and
    ii) running at least one known process on a second training representation, corresponding to the first training representation, but under a different lighting condition, and on the modified version of the first training representation to generate an error signal wherein the process is selected such that the first trainable transform is arranged to enhance features within the first training representation;
  and;
  c) use the error signal to train the first transform.

According to a sixth aspect of the invention there is provided a method of localising a vehicle comprising using a sensor of the vehicle arranged to take current representations of the surroundings of the vehicle, wherein the method comprises one or more of the following:
   a) performing at least one of:
      i) transforming the current representations using a transform and searching a library of stored representations for the transformed image; and
      ii) transforming at least some of the stored representations from the library and searching the transformed stored representations for the current representation;
   wherein the transformation performed in step a) is arranged to enhance features within the transformed representation; and
   b) using representations from the library of stored representations that are located in the search to localise the vehicle.

According to a seventh aspect of the invention there is provided a machine readable medium containing instructions which when read by a computer cause that computer on a vehicle to perform at least one of the following:
   a) use a sensor of the vehicle arranged to take current representations of the surroundings of the vehicle;
   b) performing at least one of:
      i) transforming the current representations using a transform and searching a library of stored representations for the transformed image; and
      ii) transforming at least some of the stored representations from the library and searching the transformed stored representations for the current representation;
   wherein the transformation performed in step a) is arranged to enhance features within the transformed representation; and
   c) using representations from the library of stored representations that are located in the search to localise the vehicle.

The machine readable medium referred to in any of the above aspects of the invention may be any of the following: a CDROM; a DVD ROM/RAM (including −R/−RW or +R/+RW); a hard drive; a memory (including a USB drive; an SC card; a compact flash card or the like); a transmitted signal (including an Internet download, ftp file transfer of the like); a wire; etc.

Features described in relation to any of the above aspects of the invention may be applied, mutatis mutandis, to any of the other aspects of the invention.

BRIEF DESCRIPTION OF AN EMBODIMENT OF THE INVENTION

FIG. 1 schematically shows an embodiment of an embodiment;

FIG. 2 schematically shows the architecture used in stage 1 arranged to train a pair of generators to transfer appearance from source to target representations, and vice-versa, without requiring registration of the representations;

FIG. 3 schematically shows the architecture used in stage 2 of the training process on a well-aligned subset of the training representations in order to minimise the difference between feature detector and descriptor layers between different conditions;

FIG. 4 shows the Haar response stack;

FIG. 5 schematically shows the internal architecture;

FIG. 6 illustrates images generated (right hand images) from an input image (left hand image);

FIG. 7 highlights localisation error and shows real day to real night localisation vs. real day to synthetic day localisation;

Figure 1:
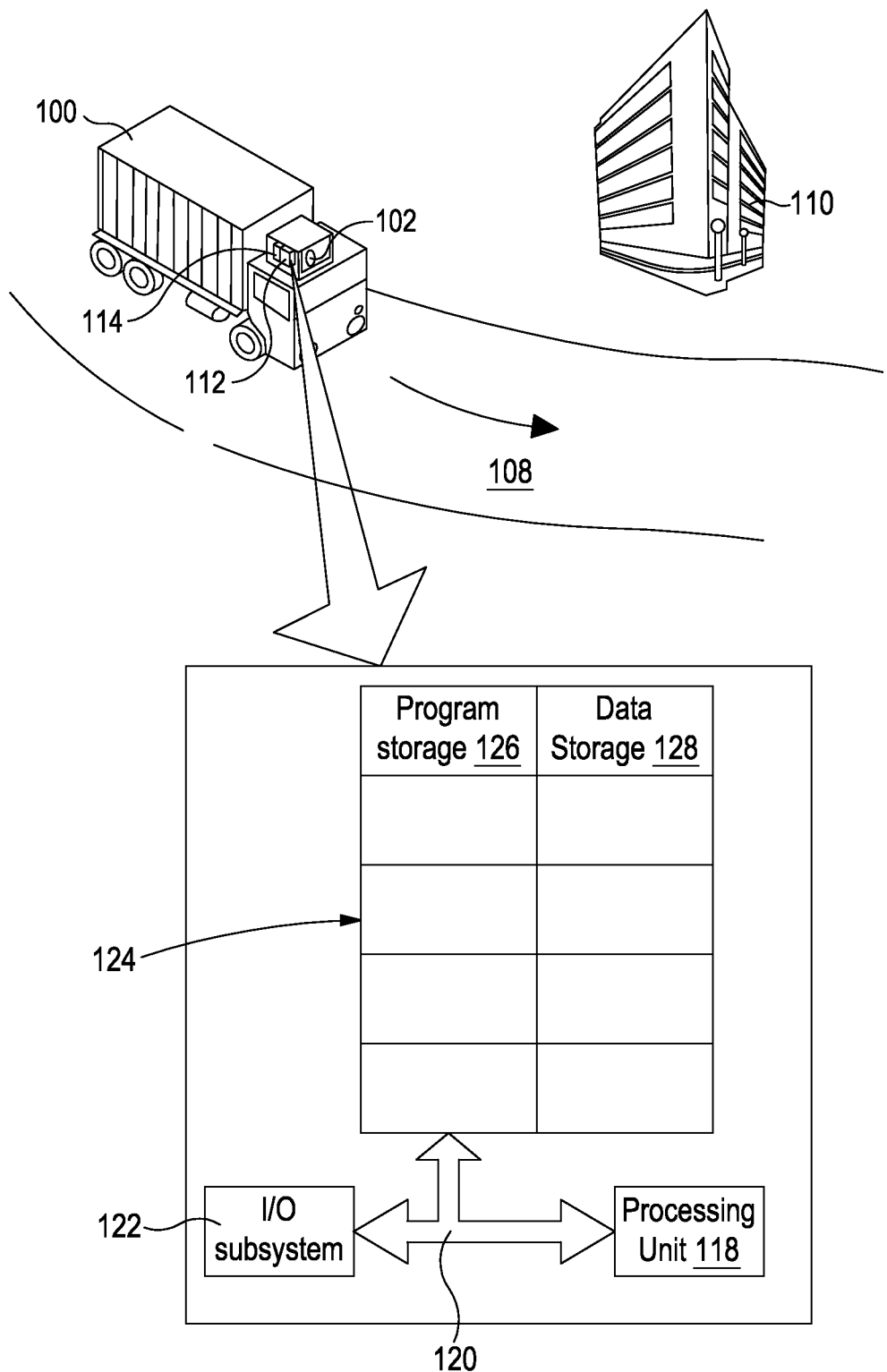

FIG. 1 describes a vehicle arranged to a trainable transform that have been trained according to a later described embodiment. Thus, FIG. 1 describes a system that utilises the output, a trainable transform, of the later described training process.

FIG. 1 shows a vehicle 100 on which there is a sensor 102. Here the sensor is a monocular camera but might be any other suitable sensor; for example a steroscopic camera pair, a LiDAR sensor, or the like.

The sensor 102 is arranged to monitor its locale and generate data based upon the monitoring thereby providing data on a sensed scene around the vehicle.

In the embodiment shown in FIG. 1, the vehicle 100 is travelling along a road 108 and the sensor 100 is imaging the locale (eg the building 110, road 108, etc.) as the vehicle 100 travels. In this embodiment, the vehicle 102 also comprise processing circuitry 112 arranged to capture data from the sensor and subsequently to process the data (in this case images, but could be other representations) generated by the sensor 102. Thus, the processing circuitry captures data from the sensor 102. In the embodiment being described, the processing circuitry 112 also comprises, or has access to, a storage device 114 on the vehicle.

The vehicle may employ a localisation pipeline as described in reference [3] above. Paper [3] is hereby incorporated by reference and the skilled person is directed to read this paper, particularly with reference to the localisation pipeline.

The lower portion of the Figure shows components that may be found in a typical processing circuitry 112. A processing unit 118 may be provided which may be an Intel® x86 processor such as an I5, I7 processor or the like. The processing unit 118 is arranged to communicate, via a system bus 120, with an I/O subsystem 122 (and thereby with external networks, displays, and the like) and a memory 124.

The skilled person will appreciate that memory 124 may be provided by a variety of components including a volatile memory, a hard drive, a non-volatile memory, any of the machine readable media described elsewhere, etc. Indeed, the memory 124 may comprise a plurality of components under the control of the processing unit 118.

However, typically the memory 124 provides a program storage portion 126 arranged to store program code which when executed performs an action and a data storage portion 128 which can be used to store data either temporarily and/or permanently.

In other embodiments at least a portion of the processing circuitry 112 may be provided remotely from the vehicle. As such, it is conceivable that processing of the data generated by the sensor 102 is performed off the vehicle 100 or a partially on and partially off the vehicle 100. In embodiments in which the processing circuitry is provided both on and off the vehicle then a network connection (such as a 3G UMTS (Universal Mobile Telecommunication System), 4G (such as LTE—Long Term Evolution), WiFi (IEEE 802.11), WiMAX, or like).

It is convenient to refer to a vehicle 100 travelling along a road but the skilled person will appreciate that embodiments of the invention need not be limited to land vehicles and could water borne vessels such as ships, boats or the like or indeed air borne vessels such as airplanes, or the like. Indeed, it may be that the method is performed by entities other than vehicles, such as robots, or mobile devices carried by users, or the like.

Likewise, it is convenient in the following description to refer to image data generated by the sensor 100 but other embodiments of the invention may generate other types of the data. As such, the embodiment being described utilises images, ie pictures of the environment. However, it is conceivable that other types of representations of the environment may be suitable. For example, LiDAR scans, may be used instead of images. Therefore, reference to image below should be taken to cover other types of data.

The embodiment being described trains a neural network (NN) to transform images. The NN provides an example of a trainable transform. The trained NN can then be used to generate images which can then be used, as described hereinafter, to aid localisation of the vehicle, or the like.

The embodiment being described uses a feature detection and matching pipeline using the SURF feature [22] H. Bay, T. Tuytelaars, and L. Van Gool, "Surf: Speeded up robust features," Computer vision-ECCV 2006, pp. 404-417, 2006, and employs a 2-stage training strategy. Other embodiments may not use both stages of the embodiment being described. It is possible that other embodiments will use just the first stage, or just the second stage. However, use of both stages together has been found to prove advantageous in the quality of the synthetic images generated by the embodiment being described.

In the first stage a cycle-consistency architecture, similar to [7], is used to train a generator to transform an input source image into a synthetic image with a target condition. The generator may be thought of as a trainable transform, since it is trained during the training phase and is arranged to transform an image (or other representation) input thereto. The synthetic image, generated by the first generator, is subsequently transformed by a second generator (which again may be thought of as a trainable transform) back into a synthetic image that has the initial condition, with the process being repeated in the reverse direction.

In the second stage, the image generators are fine tuned independently using a well-aligned subset of the dataset.

Figure 2:
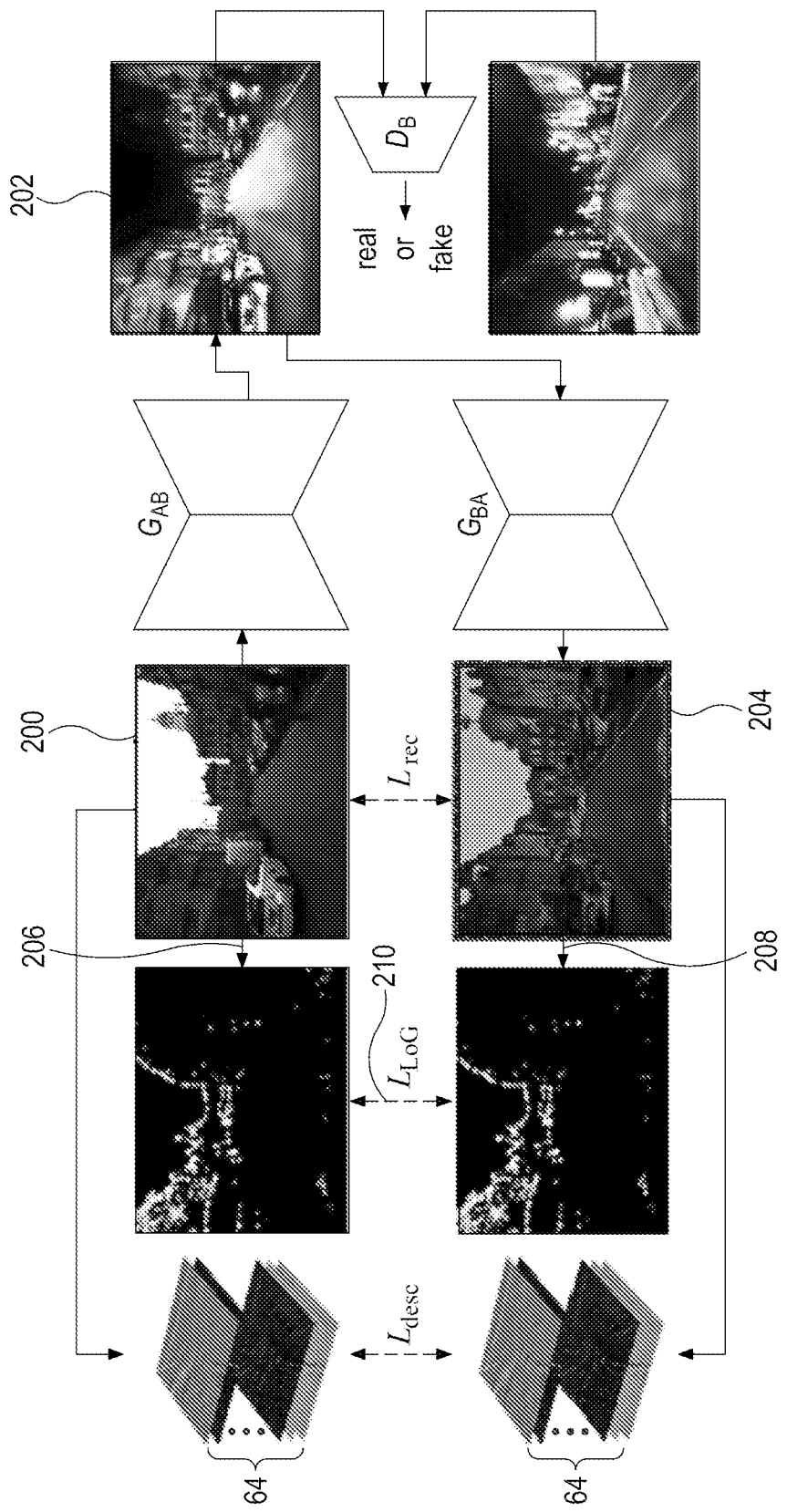

In the first stage, shown in FIG. 2, two (ie first and second trainable transforms) generators, a first GAB, which transforms condition A into condition B, and a second $G_{BA}$, which transforms condition B into condition A, are trained using a collection of unpaired source and target images. $G_{BA}$ is arranged/trained so that it learns to invert the effect of the $G_{AB}$. $G_{AB}$ and $G_{BA}$ may each be thought of as being trainable transforms. A discriminator loss is applied on the synthetic images, and an L1 loss is applied between the synthetic images and the input images. Additionally, SURF detector response maps are computed (ie the output of a known process) on the synthetic and input images and apply an L1 loss between them, and similarly compute dense per-pixel SURF descriptor maps (ie the output of the known process) on the synthetic and input images and apply an L1 loss between them; these methods are further described in III-A and III-B below.

Thus, it can be seen that the first stage takes a first training representation 200 (step 1100) and transforms it using the first trainable transform (here GAB). The output of GAB may be thought of as being a modified version 202 of the first training representation.

Then, the modified version 202 of the first training representation is input to the second trainable transform (here GBA) and a synthetic version 204 of the first training representation is generated.

Then, in the embodiment being described, both a descriptor map a detector response map is calculated (ie a known process is performed) for each of the first training 206 image and the synthetic version 208 and used to generate an error signal 210.

Here a source image may be thought of as being a first training representation and a target image may be thought of as being a second training representation. In the first stage described here, the first training representation (source image) is unpaired with the second training representation (target image), but the second training representation corresponds to a similar representation to that of the first representation.

Figure 3:
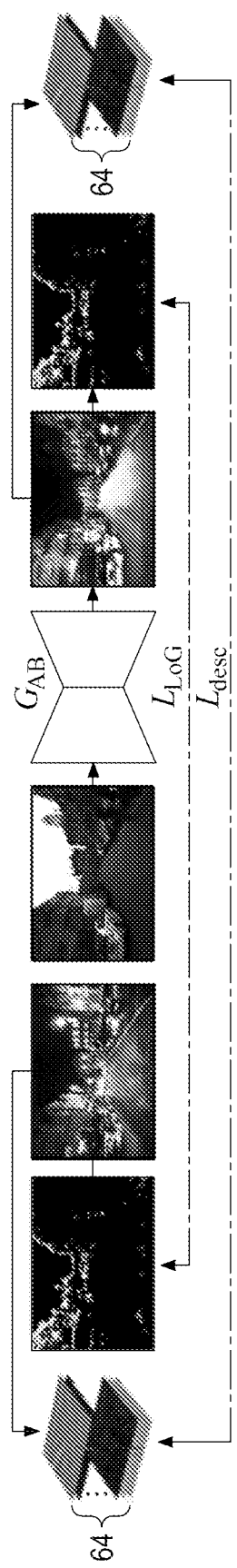

In the second stage, $G_{AB}$ and $G_{BA}$ (ie trainable transforms) are separately trained using a small dataset of aligned day and night images (ie first and second representations, with a second well aligned representation being provided for each first representation). The use of pixel-aligned images allows the generators to learn certain feature transformations that might have been uncaptured by the unsupervised method used in the first stage, which only learns to align the image distributions without any explicit pixel-wise mapping. This time, the L1 loss is applied between SURF detector response maps (ie the detector response map is the output of a known process) computed on aligned target images and synthetic images, and between dense descriptor response maps (ie the descriptor response map) computed on aligned target and synthetic images. The architecture of the second stage is shown in FIG. 3.

Thus, the second, fine tuning stage, may be thought of as taking a second training representation, corresponding to the first training representation. Here the first and second training representations are well aligned.

The trainable transform (each of $G_{AB}$ and $G_{BA}$ in turn) are then trained by transforming the first training representation to generate a modified training representation. Subsequently a surf detector map and a descriptor map are generated on both the modified first training representation and the second training representation; ie a known process is performed on each of the modified first training representation and the second training representation. An error signal is then generated by comparing the descriptor and/or detector maps to train the trainable transforms.

In the embodiment being described the first stage is followed by the second, fine tuning stage. However, it is possible that some embodiments may perform just the first stage or just the second stage.

In the above description, the generation of descriptor maps and detector maps are used in examples of a known process to run on the images. Other embodiments may use other known process such as perceptual loss where a first training image and synthetic image are input to an image classification network and comparing the activations in one of the layer(s).

Figure 5:
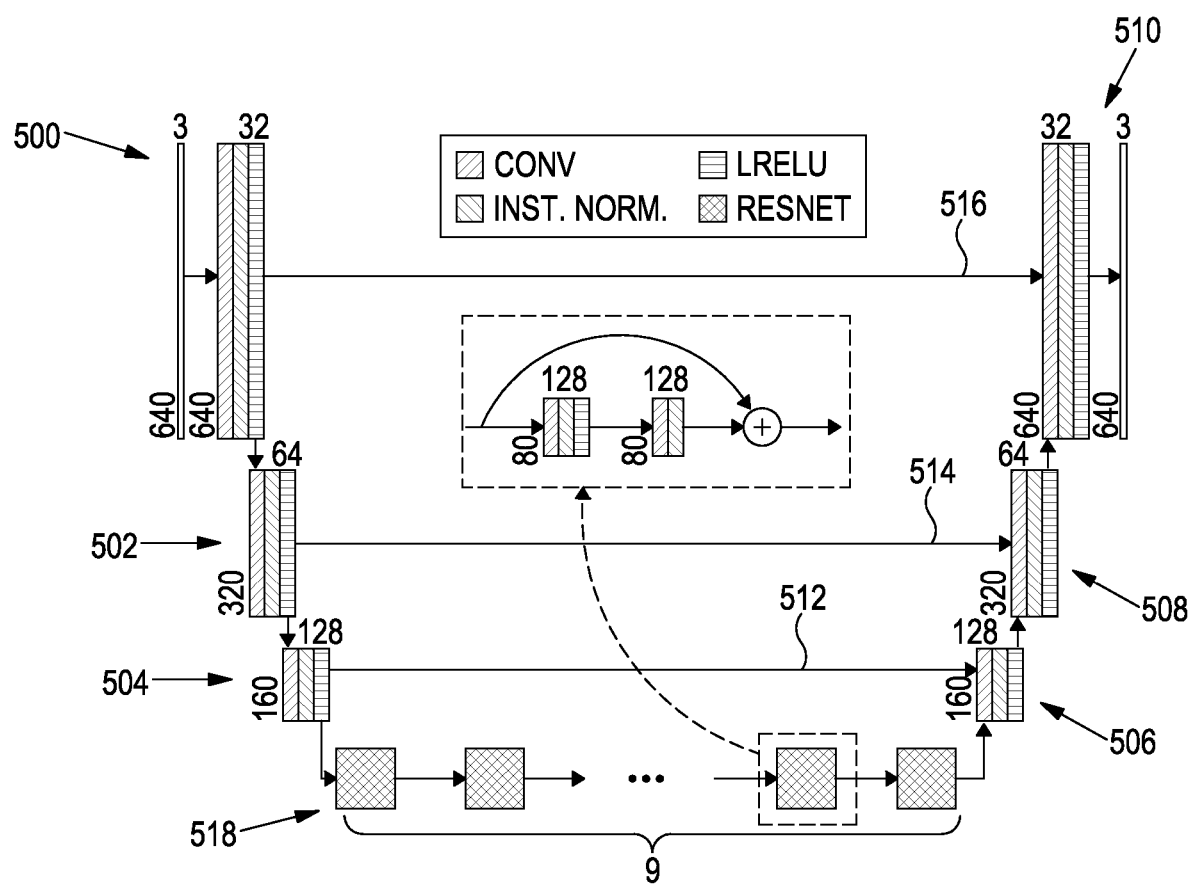
Figure 6:
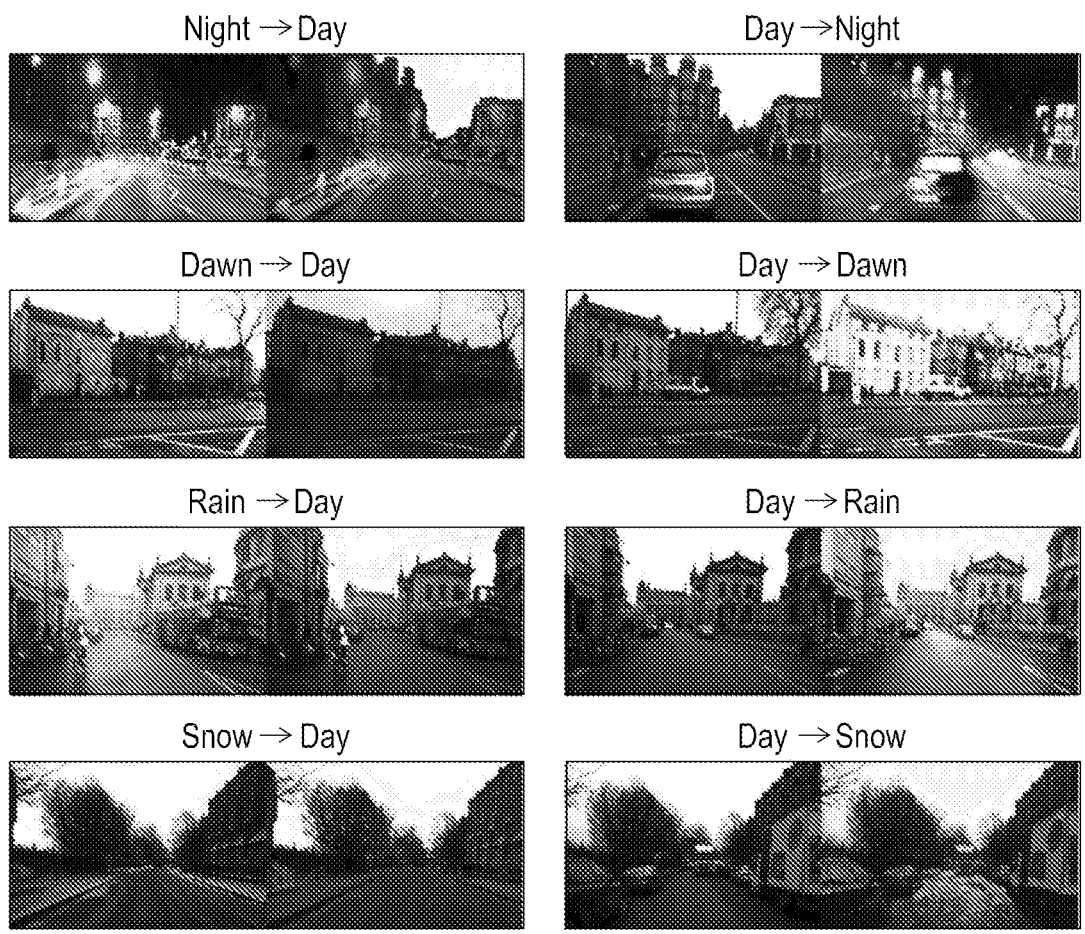

The generator architecture is based on UResNet [23] R. Guerrero, C. Qin, O. Oktay, C. Bowles, L. Chen, R. Joules, R. Wolz, M. Valdes-Hernandez, D. Dickie, J. Wardlaw, et al., "White matter hyperintensity and stroke lesion segmentation and differentiation using convolutional neural networks," arXiv preprint arXiv:1706.00935, 2017, which combines a UNet [24] O. Ronneberger, P. Fischer, and T. Brox, "U-net: Convolutional networks for biomedical image segmentation," in International Conference on Medical Image Computing and Computer-Assisted Intervention. Springer, 2015, pp. 234-241 with residual (ResNet) [25] K. He, X. Zhang, S. Ren, and J. Sun, "Deep residual learning for image recognition," in The IEEE Conference on Computer Vision and Pattern Recognition (CVPR), June 2016 modules. The internal architecture of the generator is shown in FIG. 5.

In the embodiment being described, the discriminator architecture is a CNN with 5 layers. The first 4 layers are comprised of a convolution operation followed by instance normalisation and leaky ReLu (Rectified Linear Unit), and the last layer is a convolution operation which outputs a H/8×W/8 map classifying the receptive field in the image space as real or fake, where H and W represent the height and width of the input image.

More specifically, the architecture employs 3 down-convolutional layers 500, 502, 504 with stride 2, 9 ResNet 518 blocks and 3 up-convolutional layers 506, 508, 510 with fractional stride ½, with skip connections 512, 514, 516 between corresponding down and up-convolutional layers. Each convolutional layer consists of a convolution operation, followed by instance normalisation and leaky ReLU as depicted by the shading of the layer (506-516). Each ResNet block 518 consists of a convolution, followed by instance normalisation, leaky ReLU, a second convolution, instance normalisation and addition of the original block input to the resulting output.

Figure 10:
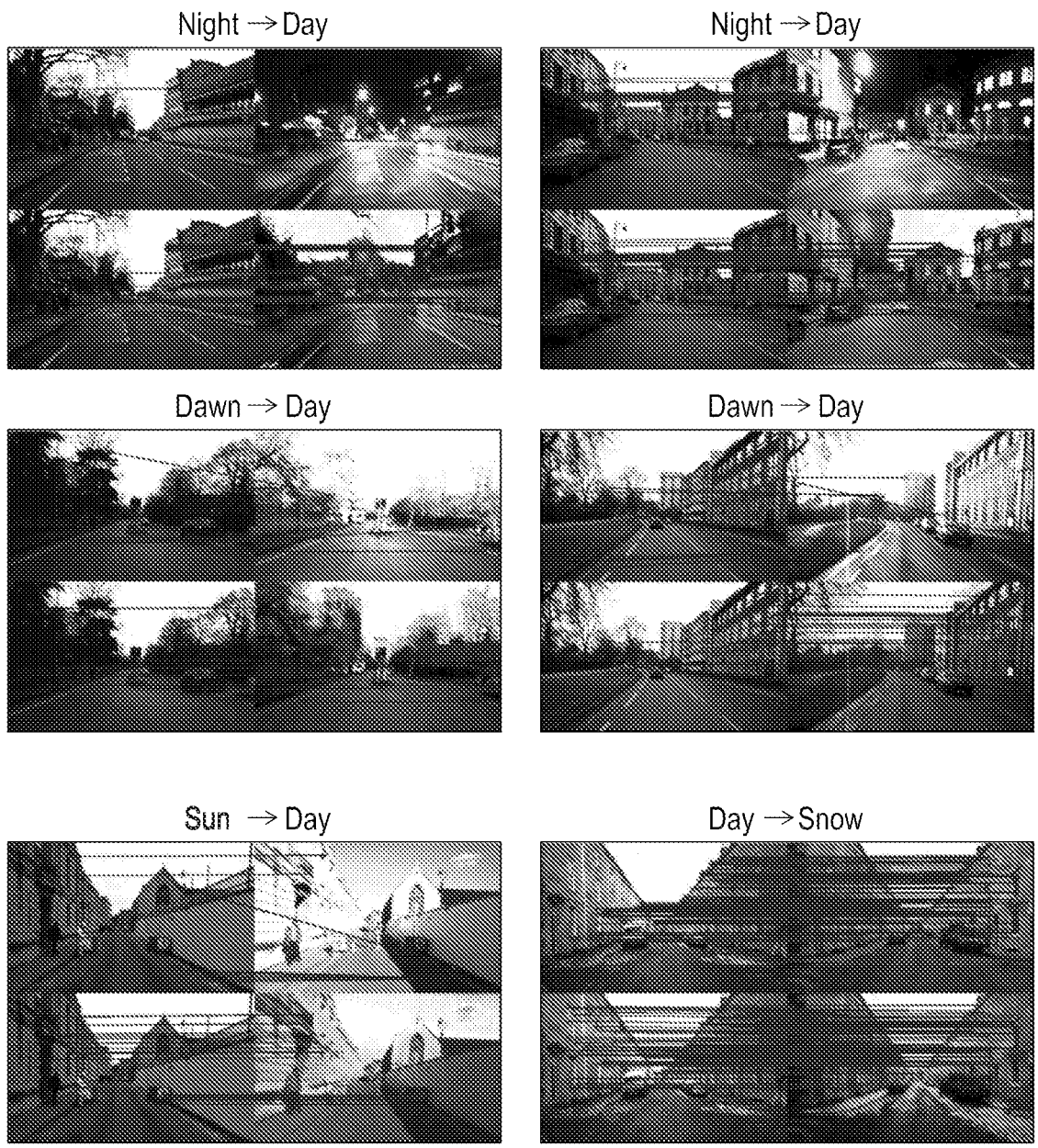
FIG. 10 shows example feature-based localisation between different conditions using appearance transfer, where the top two images of each set of four images shows matching between real images and the bottom two images shows matching between the same real image and a synthetic image (where horizontal lines represent inlier matches.
Figure 11:
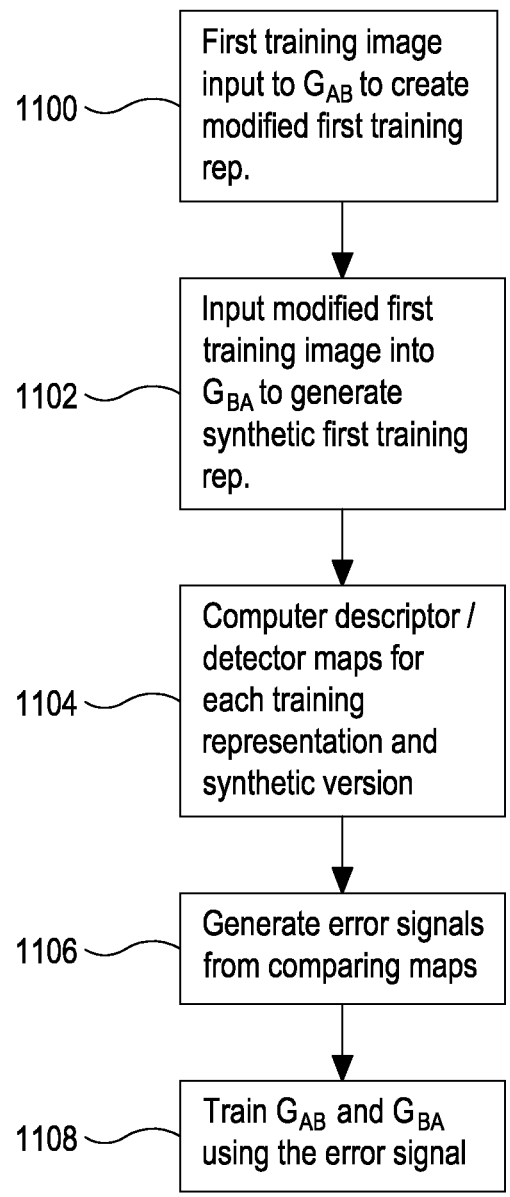
FIG. 11 shows a flowchart explaining a method.

Examples of generator results for both $G_{AB}$ and $G_{BA}$ are shown in FIG. 10 for a range of different condition pairs.

A. SURF Detector Response Map

The SURF detector response map is obtained using a convolutional version of the original method of approximating the determinants of Hessians described in [22] above. For each scale we generate three box filters to approximate the second-order derivative of the Gaussian $$\frac{\delta^2}{\delta x^2}g(\sigma), \frac{\delta^2}{\delta y^2}g(\sigma), \frac{\delta^2}{\delta xy}g(\sigma)$$

on the X,Y and diagonal directions respectively. We convolve these filters with the image I, yielding the response maps $L_{xx}\sigma(G)$, $L_{yy}(\sigma)$ and $L_{xy}(\sigma)$.

Using the Hadamard product, the matrix of approximations of the determinant of Hessians is:

$$det(\mathcal{H}_{approx})=L_{xx}\cdot L_{yy}-0.81*L_{xy}\cdot L_{xy} \quad (1)$$

Dense SURF Descriptors

The methodology used in OpenSURF ([26] C. Evans, "Notes on the OpenSURF Library," University of Bristol Tech Rep CSTR09001 January, no. 1, p. 25, 2009) is adapted and a fast, convolutional method for building dense perpixel SURF descriptors is employed, through which gradients can be passed. For each scale out of the N chosen scales, we precompute:

a look-up table for the 81 relative offsets of pixel neighbours that are used to build SURF descriptors;
an N×81-matrix for the scale-specific Gaussian weights of the 81 offsets;
a 16-length column vector for the Gaussian weights of the 16 neighbourhoods; and
HAAR-like box filters for both the X and Y directions;

The input image is then convolved with the HAAR box filters and the wavelet responses are stored. For each chosen scale we stack 81 copies of the wavelet responses and multiply them with the scale-specific Gaussian weight.

Figure 4:
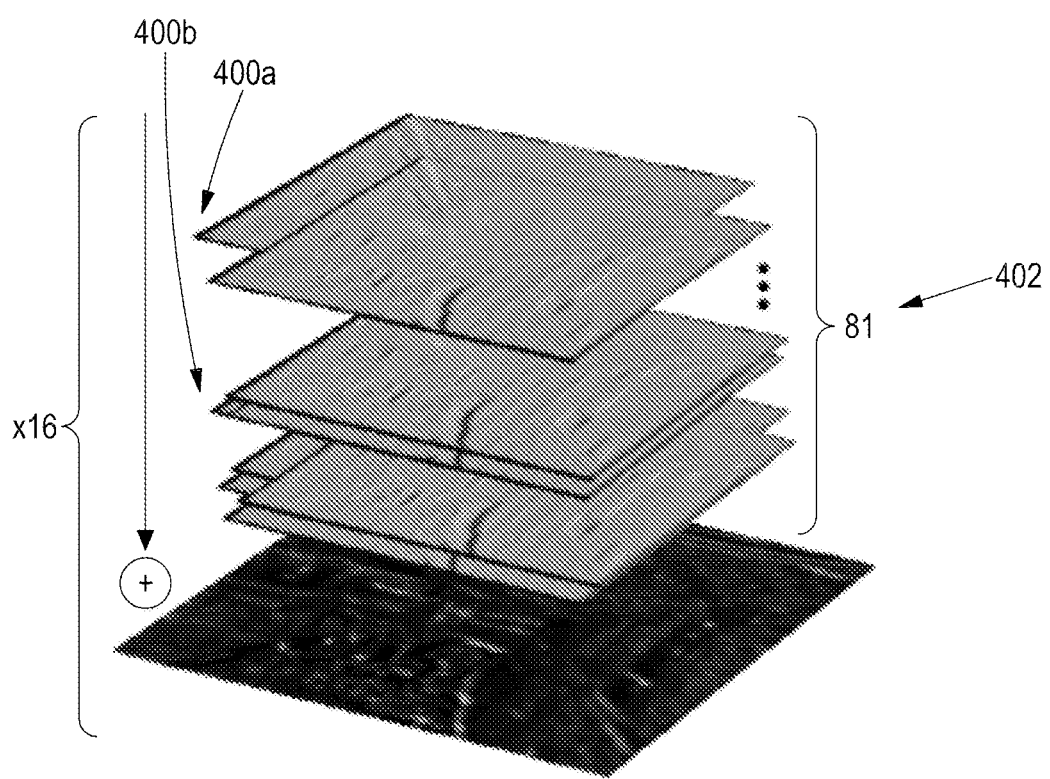

Then, for each of the 16 pixel neighbourhoods that make up a SURF descriptor we:

offset the stacked copies along the X and Y directions according to the offset look-up table (see for example offsets at 400a, 400b, etc);
multiply by the neighbourhood-specific Gaussian weight;
sum along the stack direction both the raw and absolute values for the X and Y-directions respectively, yielding 4 matrices;
element-wise multiply each matrix with its specific Gaussian neighbourhood weight LUT;
stack the 4 resulting matrices Finally, each column of the resulting 64 layer stack of H×W size matrices is normalized, where H and W are the height and width of the input images. This stack represents the dense per-pixel SURF descriptor, for each scale. The stacking and summing operation is depicted in FIG. 4.

b) Descriptor Loss:

Thus, the embodiment being described utilises a descriptor loss. Such a descriptor loss $L_{Desc}$ which may be thought of as guiding the training of the trainable transform (ie a generator) such that descriptors of regions or subregion components of transformed first representations obtained from input first representations depicting a particular scene under an initial condition match as closely as possible the descriptors of regions or subregion components of second representations depicting the particular scene under a target condition. During the training phase of the trainable transform, the first and second representation are typically provided by representations from a training set. During runtime (such as when utilised on the vehicle 100) the first representations are typically provided by representations from the sensor 102.

Alternatively, or additionally, the distribution of descriptors of regions or subregion components of transformed representations obtained from input representations depicting a particular scene under an initial condition matches as closely as possible the distribution of descriptors of regions or subregion components of images depicting the particular scene under a target condition.

Here, descriptors may represent intensities of regions or subregion components, a linear transformation of intensities of regions or subregion components, a non-linear transformation of intensities of regions or subregion components.

a) Detector Loss:

Further, the embodiment also being described utilises a detector loss. Such a detector loss may be thought of as guiding the training of the trainable transform such that the locations of regions or subregion components of interest of transformed images obtained from input images depicting a particular scene under an initial condition match as closely as possible the locations of regions or subregion components of interest of images depicting the particular scene under a target condition.

Alternatively, or additionally, the detectors are such that the distribution of locations of regions or subregion components of interest of transformed images obtained from input images depicting a particular scene under an initial condition matches as closely as possible the distribution of locations of regions or subregion components of interest of images depicting the particular scene under a target condition.

Here regions or subregion components of interest may be categorised according to their difference in intensity/amplitude across the region or variance or information content quantifiable using a common measure.

Here, transformed images includes the outputs of the trainable transforms, such as the modified and/or synthetic images.

Feature detectors and descriptors for day-night matching are evaluated in [27] (H. Zhou, T. Sattler, and D. W. Jacobs, "Evaluating local features for day-night matching," in Computer Vision—ECCV 2016 Workshops—Amsterdam, The Netherlands, October 8-10 and 15-16, 2016, Proceedings, Part III, 2016, pp. 724-736), showing that most features are detected at small scales (<10). Following experimentation, the embodiment being described computes SURF loss terms for the first 5 scales in order to speed-up the training process and it was found that this did not cause significant performance loss. An explanation for this could be that inside smaller pixel neighbourhoods, appearance changes between images with different conditions can be more uniform compared to larger neighbourhoods. However, the skilled person will appreciate that other embodiments may compute loss terms for more scales which may increase the accuracy further but generally at the penalty of increased processing times. Further, other embodiments may compute fewer than 5 scales.

B. Losses

Similar to [7], the embodiment being described applies an adversarial loss through a discriminator on the output of each generator: discriminator $D_B$ on the output of generator $G_{AB}$, and discriminator $D_A$ on the output of generator $G_{BA}$. This loss is formulated as:

$$\mathcal{L}_{B_{adv}} = (D_B(G_{AB}(I_A))-1)^2 \quad (2)$$

$$\mathcal{L}_{A_{adv}} = (D_A(G_{BA}(I_B))-1)^2 \quad (3)$$

The adversarial objective $L_{adv}$ becomes:

$$\mathcal{L}_{adv} = \mathcal{L}_{B_{adv}} + \mathcal{L}_{A_{adv}} \quad (4)$$

The discriminators are trained to minimize the following loss:

$$\mathcal{L}_{B_{adv}} = (D_B(I_B)-1)^2 + (D_B(G_{AB}(I_A)))^2 \quad (5)$$

$$\mathcal{L}_{A_{disc}} = (D_A(I_A)-1)^2 + (D_A(G_{BA}(I_B)))^2 \quad (6)$$

The discriminator objective $L_{disc}$ becomes:

$$\mathcal{L}_{disc} = \mathcal{L}_{B_{disc}} + \mathcal{L}_{A_{disc}} \quad (7)$$

The cycle consistency loss [7] is applied between the input and synthetic image, and between the SURF detector Det(·) and dense descriptor Desc(·) maps computed from these two images:

$$\mathcal{L}_{rec} = \|I_{input} - I_{reconstructed}\|_1 \quad (8)$$

$$\mathcal{L}_{LoG} = \|Det(I_{input}) - Det(I_{reconstructed})\|_1 \quad (9)$$

$$\mathcal{L}_{desc} = \|Desc(I_{input}) - Desc(I_{reconstructed})\|_1 \quad (10)$$

The complete generator objective $L_{gen}$ becomes:

$$\mathcal{L}_{gen} = \lambda_{rec} * \mathcal{L}_{rec} + \lambda_{LoG} * \mathcal{L}_{LoG} + \lambda_{desc} * \mathcal{L}_{desc} + \lambda_{adv} * \mathcal{L}_{adv} \quad (11)$$

Each λ term is a hyperparameter that weights the influence of each loss component. For the fine-tuning stage, where the target image is aligned with the input and synthetic images, the losses become:

$$\mathcal{L}_{F_{LoG}} = \|Det(I_{target}) - Det(I_{synthetic})\|_1 \quad (12)$$

$$\mathcal{L}_{F_{desc}} = \|Desc(I_{target}) - Desc(I_{synthetic})\|_1 \quad (13)$$

The fine-tuning objective $L_{finetune}$ becomes:

$$\mathcal{L}_{finetune} = \lambda_{LoG} * \mathcal{L}_{F_{LoG}} + \lambda_{desc} * \mathcal{L}_{F_{desc}} \quad (14)$$

The embodiment being described computes the generator functions $G_{AB}$, $G_{BA}$ such that:

$$G_{AB}, G_{BA} = \underset{G_{AB}, G_{BA}, D_B, D_A}{\operatorname{argmin}} \mathcal{L}_{gen} + \mathcal{L}_{disc} + \mathcal{L}_{finetune} \quad (15)$$

The embodiment being described is arranged to minimise the above losses as follows.

Data was used from 6 traversals from the Oxford RobotCar Dataset [11] W. Maddern, G. Pascoe, C. Linegar, and P. Newman, "1 Year, 1000 km: The Oxford RobotCar Dataset," The International Journal of Robotics Research (IJRR), vol. 36, no. 1, pp. 3-15, 2017, collected up to 1 year apart, yielding 5 condition pairs: day-night, day-snow, day-dawn, day-sun and day-rain. For each of the traversals, the RTK-GPS ground truth was filtered and any data points with more than 25 cm of translation standard deviation were discarded.

Training datasets for each condition pair were created from the entirety of the day traversal and a portion representing approximately 20% of the paired condition, to simulate a case where reasonable amounts of mapping data cannot be acquired. The remaining 80% of the paired condition was used to benchmark the performance of the synthetic images.

The well-aligned datasets used in the second training stages were created by selecting image pairs between which none or only a small viewpoint rotation existed. Image pairs with no translation or rotation misalignment were used as-is, and for those with small rotational differences the target images were affine-warped into the frame of the source images using the known poses provided by the RTK-GPS ground truth.

A. Training

For the cycle-consistency stage (ie the first stage), a network training regimen similar to [7] is employed. For each iteration the discriminator, is trained on a real target domain image and a synthetic image from a previous iteration with the goal of minimizing $L_{disc}$, and then the generators are trained on input images to minimize $L_{gen}$. In particular, the embodiment being described used the Adam solver ([28] D. P. Kingma and J. Ba, "Adam: A method for stochastic optimization," CoRR, vol. abs/1412.6980, 2014) with an initial learning rate set at 0.0002, a batch size of 1, $\lambda_{rec}=8$, $\lambda_{det}=2$, $\lambda_{desc}=2$ and $\lambda_{adv}=1$. The skilled person will appreciate that other solvers are possible.

For the fine-tuning stage (ie the second stage), a small well-aligned subset of the dataset was used for training, and arranged to minimize $L_{finetune}$, with the same learning parameters.

B. Localisation

Once the parameters have been learnt by the methods described above, it is possible to use the parameters for localisation of a vehicle, or the like.

One embodiment, now described, used the trained generators $G_{AB}$ to transform the day map frames into target-condition frames, and $G_{BA}$ to transform the 5 types of target-condition frames into day-condition frames.

To benchmark the synthetic images in the context of localisation, embodiments used the experience-based navigation system of [3] which implements a feature-based topological localiser ([29] M. Cummins and P. Newman, "Appearance-only slam at large scale with fab-map 2.0," The International Journal of Robotics Research, vol. 30, no.

9, pp. 1100-1123, 2011) followed by a geometric verification stage using RANSAC ([30] M. A. Fischler and R. C. Bolles, "Random sample consensus: a paradigm for model fitting with applications to image analysis and automated cartography," Communications of the ACM, vol. 24, no. 6, pp. 381-395, jun 1981) and a nonlinear optimisation to minimise inlier reprojection errors.

In contrast to adding the synthetic frames as a separate map, feature correspondences were accumulated from real to real image matching and synthetic to real image matching, and it was found that this lead to more robust and accurate solutions.

In the embodiment being described, the generator runs at approximately 1 Hz for images with a resolution of 1280×960, and at approximately 3 Hz for images with a resolution of 640×480 on an Nvidia Titan X GPU. The skilled person will appreciate that these frequencies will likely change as different processors (ie GPU's) are used.

RESULTS

A. Quantitative Results

Below, results are shown taking into consideration both the frequency and the quality of localisation.

els, illustrating the performance of the method when localising relative to a single condition. In all cases the localisation rate is improved (often by a factor of 2) and the metric errors are reduced.

Figure 7:
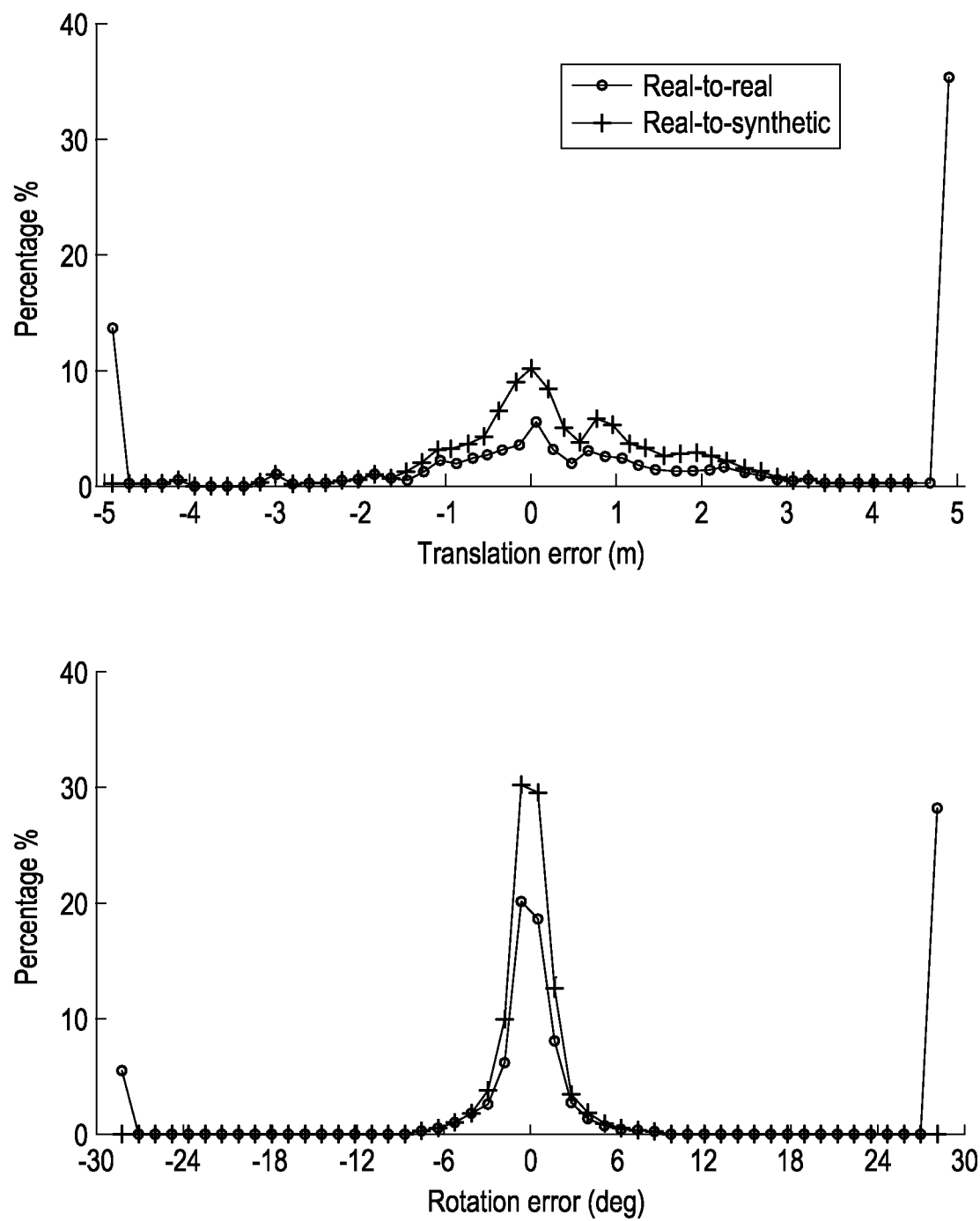

FIG. 7 shows two histograms giving the distribution of translation and rotation errors with respect to ground truth, each histogram showing the raw image matching and for our best solution, in the case of day-night localisation. Overall a large improvement in localisation accuracy was observed, compared to raw images and images produced by an RGB-only implementation of [7].

To generate the histograms, translation outliers larger than 5 meters in absolute have been accumulated in the −5 and +5 meter bins. Rotation outliers larger than 30 degrees in absolute have been accumulated in the −30 and +30 degree bins.

Figure 8:
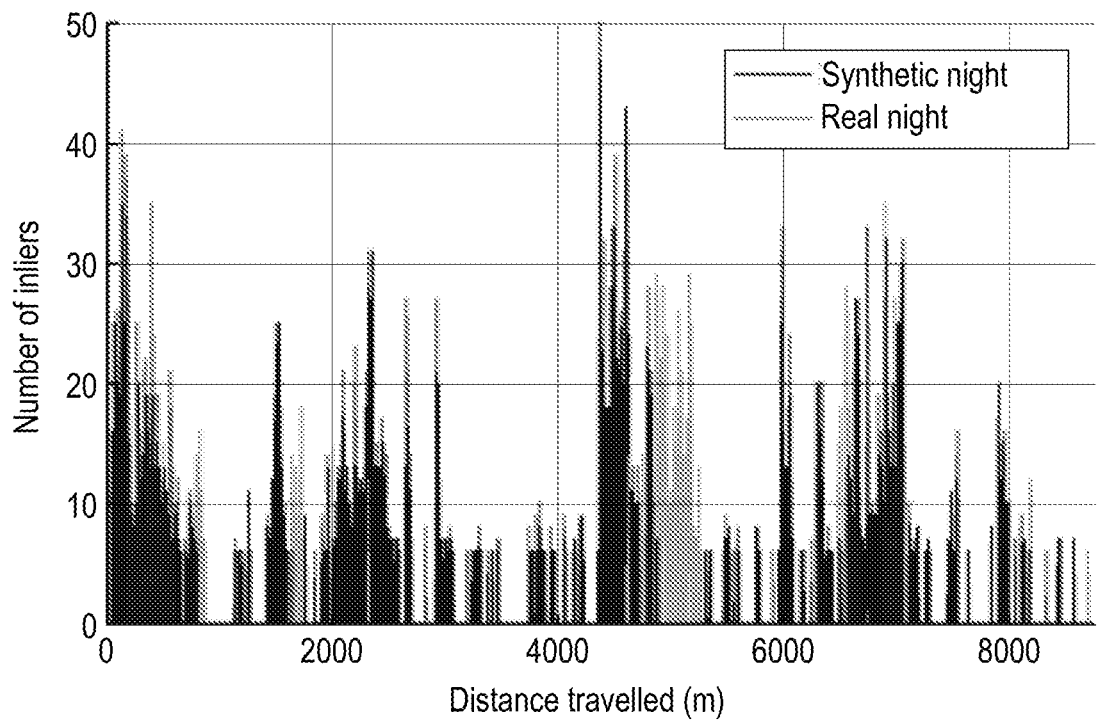
FIG. 8 shows the inlier count for real day vs. real night localisation and real day vs. synthetic night as a function of distance travelled.

FIG. 8 shows the number of match inliers as a function of the distance travelled, for the raw images and for our best solution, in the case of day-night localisation. A significant increase in the number of inliers for real-to synthetic matching, compared to real-to-real image matching was observed.

Figure 9:
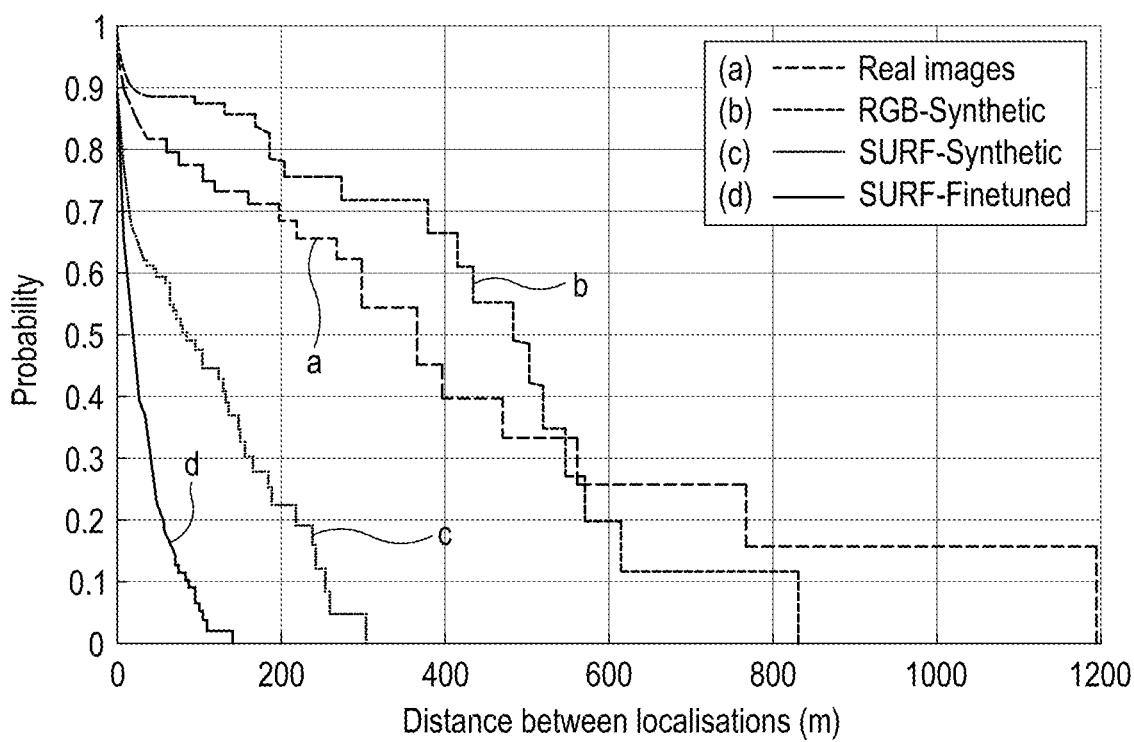
FIG. 9 shows a graph giving probability of dead reckoning as a function of distance, when a localisation failure has occurred.

FIG. 9 shows the probability of travelling in (Visual Odometry) VO-based open-loop when a localisation failure

TABLE I

METRIC LOCALISATION FOR DIFFERENT NETWORK ARCHITECTURES

| Map vs. Traversal | REFERENCE | | | RGB - only | | | SURF | | | SURF + finetune | | |
|---|---|---|---|---|---|---|---|---|---|---|---|---|
| | % | RMSE (M) | RMSE (o) | % | RMSE (M) | RMSE (o) | % | RMSE (M) | RMSE (o) | % | RMSE (M) | RMSE (o) |
| Real Day vs. Real Night | 19.5 | 12.74 | 24.06 | — | — | — | — | — | — | — | — | — |
| Real Day vs. Synthetic Day | — | — | — | 25 | 3.59 | 11.38 | 51 | 2.43 | 4.06 | 60 | 1.99 | 3.32 |

Table I compares the root mean squared translation (RMSE (m)) and rotation errors (RMSE (O)), with respect to the RTK-GPS ground truth, and the cumulative successfully localized portion as a percentage of the distance travelled in the case of day-night localisation. Results are shown for raw images, images obtained with an RGB-only implementation of [7], and images obtained using stages 1 and 2 of the embodiment described above. The results show an increase in the accuracy of localisation using synthetic images generated from the stage-1 model, and a further increase in accuracy from the stage-2 fine-tuned model.

TABLE II

METRIC LOCALISATION PERFORMANCE BETWEEN CONDITIONS

| Map vs. Traversal | REFERENCE | | | Synthetic | | |
|---|---|---|---|---|---|---|
| | % | RMSE (M) | RMSE (o) | % | RMSE (M) | RMSE (o) |
| Day vs. Night | 19.5 | 12.74 | 24.06 | 51.0 | 2.43 | 4.06 |
| Day vs. Snow | 94.6 | 9.02 | 8.07 | 98.6 | 3.38 | 8.19 |
| Day vs. Dawn | 31.9 | 11.59 | 7.04 | 66.8 | 2.55 | 6.30 |
| Day vs. Sun | 33.0 | 32.5 | 82.04 | 71.0 | 9.40 | 24.52 |
| Day vs. Rain | 27.2 | 11.28 | 9.85 | 58.6 | 2.91 | 7.84 |

Table II presents localisation results for a wide range of conditions transformed into day using stage-1 trained modoccurs, as a function of distance travelled. Significant improvements, were observed, when using synthetic images generated using the embodiment described above. It is noted that, perhaps surprisingly, images generated using an RGB-only implementation of [7] did not bring a large improvement in robustness.

From FIG. 9, it will be noted that there is observed a large increase in the robustness of day-night localisation when using synthetic images. To generate FIG. 9, the map is from daytime, the input images are at night.

B. Qualitative Results

FIG. 10 presents qualitative results in a series of locations throughout Oxford where matching between raw images failed or produced a very small number of inliers. Matching within the image pairs is represented by a horizontal line between points that have been matched within the image pairs. The figure presents matches between real images (top) and between real and synthetic images (bottom). Note how the learned image transformation (by construction) does a qualitatively good job reconstructing details that are described by the feature detector and descriptor, such as window frames.

CONCLUSIONS

A system is presented that yields robust localisation under adverse conditions. The system may be thought of as taking input images which are transformed in such a way as to enhance point wise matching to a stored image (for example on an image library to which a vehicle or other entity has access). In the embodiment being described, trainable transformation is learnt using a cyclic GAN while explicitly accounting for the attributes feature detection and description stages. The embodiment described utilises feature detectors and descriptor responses.

Using modest target training data, which emulates scenarios where mapping is expensive, time consuming or difficult, the embodiment described generated resulting synthetic images which consistently improved place recognition and metric localisation compared to baselines. Thus, such embodiments may not only reduce, perhaps drastically, the cost and inconvenience of mapping under diverse conditions, but also improving the efficacy of the maps produced when used in conjunction with our method.

Further the described embodiment is typically arranged to processes the image streams outside of the localisation pipeline, either offline or online, and hence may be used as a front end to many existing systems.

The invention claimed is:

1. A computerised method of generating a first trainable transform arranged to be used in localisation of an entity, the first trainable transform being arranged to transform a first representation of an environment representing a scene captured under a first lighting or weather condition to a second, different, representation of the environment modeling the same scene under a second, different lighting or weather condition, the method comprising:
   a) i) generating a modified first training representation of an environment by processing a first training representation of the environment using the first trainable transform, the first training representation representing a scene captured under the first lighting or weather condition and the modified first training representation modelling the same scene under the second lighting or weather condition;
   ii) generating a synthetic first training representation by processing the modified first training representation using a second trainable transform, the second trainable transform arranged to transform a training representation of an environment representing a scene captured under the second lighting or weather condition to a representation of the environment modelling the same scene under the first lighting or weather condition;
   iii) running at least one known process on the first training representation and the synthetic first training representation to generate a first error signal encapsulating a difference between the first training representation and the synthetic first training representation, wherein the process is selected such that the first trainable transform is arranged to enhance features within the first training representation; and
   iv) training at least the first trainable transform based on the first error signal; and;
   b) i) generating a modified second training representation of an environment by processing a second training representation of the environment using the first trainable transform, the second training representation representing a scene captured under the first lighting or weather condition and the modified second training representation of the environment modelling the same scene under the second lighting or weather condition;
   ii) running at least one known process on the modified second training representation, and on a third training representation captured under the second lighting or weather condition and representing the same scene as the second training representation, to generate a second error signal encapsulating a difference between the second training representation and the third training representation; and
   iii) training the first trainable transform based on the second error signal.

2. A method according to claim 1 wherein the first error signal is also used to train the second trainable transform.

3. A method according to claim 2 wherein the first and/or second trainable transforms are provided by a neural network.

4. A method according to claim 3 wherein the known process generates feature descriptors.

5. A method according to claim 4 wherein the known process detects features within the first and second representations.

6. A method according to claim 5 in which weights of the trainable transform are initialized before training commences.

7. A method according to claim 6 which trains a discriminator to be able to discriminate whether a representation is a synthetic representation.

8. A method according to claim 7 which repeats training of the method using a set of second training representations being representations corresponding to representations from the first training representations but under different lighting or weather conditions.

9. Use of a trainable transform, trained according to the method of claim 8, and used in a vehicle to localise, or at least assist, in localising the vehicle in matching input representation against a library of stored representations.

10. A vehicle having a sensor arranged to take current representations of the vehicle surroundings, the current representations capturing the vehicle surroundings under a first lighting or weather condition and the vehicle further comprising a processing circuitry having access to a library of stored representations of the surroundings, the stored representations including representations of the surroundings under a second, different lighting or weather condition, wherein the processing circuitry is arranged to perform the following:
   a) at least one of:
      i) transforming the current representations using a first trainable transform to transform the current representations to transformed representations modeling the same vehicle surroundings under the second lighting or weather condition and searching the library of stored representations to match the transformed image wherein the transformation is arranged to enhance features within the transformed representation; and
      ii) transforming at least some of the stored representations from the library using a second transform arranged to transform the stored representations to transformed stored representations modeling the same vehicle surroundings under the first lighting or weather conditions, and searching the transformed stored representations to match the current representation, wherein the transformation is arranged to enhance features within the transformed representation, wherein the first and second transforms are trained by a Machine Learning algorithm;
   b) using representations from the library of stored representations that are located in the search as matches to localise the vehicle.

11. A system arranged to train a first trainable transform arranged to transform a first representation of an environment representing a scene captured under a first lighting or weather condition to a second, different, representation of the environment modeling the scene under a second, different lighting or weather condition, the system comprising processing circuitry being programmed to:
   a) i) generating a modified first training representation of an environment by processing a first training representation of the environment using the first trainable transform, the first training representation representing a scene captured under the first lighting or weather condition and the modified first training representation modelling the same scene under the second lighting or weather condition;
      ii) generate a synthetic first training representation by processing the modified first training representation using a second trainable transform, the second trainable transform arranged to transform a training representation of an environment representing a scene captured under the second lighting or weather condition to a representation of the environment modeling the same scene under the first lighting or weather condition
      iii) run at least one known process on the first training representation and the synthetic training representation to generate an error signal encapsulating a difference between the first training representation and the synthetic first training representation, wherein the process is selected such that the first trainable transform is arranged to enhance features within the first training representation; and
      iv) train at least the first trainable transform based on the first error signal and;
   b) i) generating a modified second training representation of an environment by processing a second training representation of the environment representing a scene captured under the first lighting or weather condition and the modified second training representation of the environment modeling the same scene under the second lighting or weather condition;
      ii) run at least one known process on the modified second training representation, and on a third training representation captured under the second lighting or weather condition and representing the same scene as the second training representation, to generate a second error signal encapsulating a difference between the second training representation and the third training representation; and
      iii) train the first trainable transform based on the second error.

12. A machine readable medium containing instructions which when read by a computer cause that machine to train a first trainable transform arranged to be used in localisation of an entity, the first trainable transform being arranged to transform a first representation of an environment representing a scene captured under a first lighting or weather condition to a second, different, representation of the environment modelling the same scene under a second, different lighting or weather condition, the first trainable transform trained by performing at least:
   a) i) generating a modified first training representation of an environment by processing a first training representation of the environment using the first trainable transform, the first training representation representing a scene captured under the first lighting or weather condition and the modified first training representation modelling the same scene under the second lighting or weather condition;
      ii) generating a synthetic first training representation by processing the modified first training representation using a second trainable transform, the second trainable transform arranged to transform a training representation of an environment representing a scene captured under the second lighting or weather condition to a representation of the environment modelling the same scene under the first lighting or weather condition;
      iii) running at least one known process on the first training representation and the synthetic first training representation to generate a first error signal encapsulating a difference between the first training representation and the synthetic first training representation, wherein the process is selected such that the first trainable transform is arranged to enhance features within the first training representation; and
      iv) training at least the first trainable transform based on the first error signal; and;
   b) i) generating a modified second training representation of an environment by processing a second training representation of the environment using the first trainable transform, the second training representation representing a scene captured under the first lighting or weather condition and the modified second training representation of the environment modelling the same scene under second lighting or weather condition;
      ii) running at least one known process on the modified second training representation, and on a third training representation captured under the second lighting or weather condition and representing the same scene as the second training representation, to generate a second error signal encapsulating a difference between the second training representation and the third training representation; and
      iii) training the first trainable transform based on the second error signal.

13. A method of localising a vehicle comprising using a sensor of the vehicle arranged to take current representations of the surroundings of the vehicle, the current representations representing a scene captured under a first lighting or weather condition, wherein the method comprises:
   a) performing at least one of:
      i) transforming the current representations using a first trainable transform to transform the current representations to transformed current representations modeling the same scene under a second, different lighting or weather condition, and searching a library of stored representations to match the transformed current representations wherein the transformation is arranged to enhance features within the transformed representation, the stored representations including representations of the surroundings under a second, different lighting or weather condition; and
      ii) transforming at least some of the stored representations from the library using a second transform arranged to transform to transformed stored representations modeling the same scene under the first lighting or weather condition and searching the transformed stored representations to match the current representation wherein the transformation is arranged to enhance features within the transformed representation, wherein the first and second transforms are trained by a Machine Learning algorithm;

b) using representations from the library of stored representations that are located in the searches of step a) i) and/or step a) ii) to localise the vehicle.

14. A machine readable medium containing instructions which when read by a computer cause that computer on a vehicle to:
- a) use a sensor of the vehicle arranged to take current representations of the surroundings of the vehicle, the current representations representing the vehicle surroundings captured under a first lighting or weather condition;
- b) performing at least one of:
  - i) transforming the current representations using a first trainable transform arranged to transform the current representations to transformed current representations modeling the same surroundings under a second, different lighting or weather condition, and searching a library of stored representations to match the transformed current representations wherein the transform is arranged to enhance features within the transformed current representations; and
  - ii) transforming at least some of the stored representations from the library using a second transform arranged to transform the stored representation to transformed stored representations modeling the same surroundings under the first lighting or weather condition, and searching the transformed stored representations to match the current representation wherein the transform is arranged to enhance features within the transformed representation, wherein the first and second transforms are trained by a Machine Learning algorithm; and
- c) using representations from the library of stored representations that are located as matches in the search to localise the vehicle.

15. The computerized method of claim 1, wherein the first lighting or weather condition and the second, different lighting or weather condition are the first lighting condition and the second, different lighting condition.

16. The computerized method of claim 1, wherein the first lighting or weather condition and the second, different lighting or weather condition are the first weather condition and the second, different weather condition.

17. The vehicle of claim 10, wherein the first lighting or weather condition and the second, different lighting or weather condition are the first lighting condition and the second, different lighting condition.

18. The vehicle of claim 10, wherein the first lighting or weather condition and the second, different lighting or weather condition are the first weather condition and the second, different weather condition.

19. The method of claim 13, wherein the first lighting or weather condition and the second, different lighting or weather condition are the first lighting condition and the second, different lighting condition.

20. The method of claim 13, wherein the first lighting or weather condition and the second, different lighting or weather condition are the first weather condition and the second, different weather condition.

* * * * *